United States Patent
Takei et al.

(10) Patent No.: US 10,106,044 B2
(45) Date of Patent: Oct. 23, 2018

(54) CHARGER HAVING FORCED STOP EXECUTION CIRCUIT TO PROVIDE PROTECTION TO A PROTECTION TARGET

(71) Applicant: FUJI ELECTRIC CO., LTD., Kawasaki-shi (JP)

(72) Inventors: Osamu Takei, Hino (JP); Hiroji Nishida, Hino (JP)

(73) Assignee: FUJI ELECTRIC CO., LTD., Kawasaki (JP)

(*) Notice: Subject to any disclaimer, the term of this patent is extended or adjusted under 35 U.S.C. 154(b) by 371 days.

(21) Appl. No.: 15/178,693

(22) Filed: Jun. 10, 2016

(65) Prior Publication Data

US 2016/0280080 A1 Sep. 29, 2016

Related U.S. Application Data

(63) Continuation of application No. PCT/JP2014/064541, filed on May 30, 2014.

(51) Int. Cl.
*H02J 7/00* (2006.01)
*H02M 3/335* (2006.01)
(Continued)

(52) U.S. Cl.
CPC .......... *B60L 11/1811* (2013.01); *H02H 7/125* (2013.01); *H02H 7/1213* (2013.01);
(Continued)

(58) Field of Classification Search
CPC . Y02E 60/12; H02J 7/025; H02J 7/022; H02J 7/045; H01F 38/14; Y02T 90/122;
(Continued)

(56) References Cited

U.S. PATENT DOCUMENTS 9,257,897 B2 2/2016 Saeck et al.
2007/0228834 A1 10/2007 Hirahara
(Continued)

FOREIGN PATENT DOCUMENTS

CN 102355024 A 2/2012
DE 10 2008 053 702 A1 5/2010
(Continued)

OTHER PUBLICATIONS

Office Action dated Dec. 7, 2017 in corresponding Chinese Patent Application No. 201480067946.8, 12 pp.
(Continued)

*Primary Examiner* — Yalkew Fantu
*Assistant Examiner* — Mohammed J Sharief (57) ABSTRACT

First and second detectors and first and second forced stop circuits are included in a charger including an AC/DC converter having a PFC circuit that converts AC power supplied from an external AC power supply into DC power and a smoothing capacitor, and a DC/DC converter that transforms power output by the AC/DC converter and supplies the transformed power to a vehicle-mounted battery. The first and second detectors detect voltage applied to the vehicle-mounted battery. The first forced stopper determines whether or not voltage detected by the first detector exceeds a predetermined threshold, and causes the DC/DC converter to stop when the predetermined threshold is exceeded. The second forced stopper determines whether or not voltage detected by the second detector exceeds the threshold, and causes the DC/DC converter to stop when the threshold is exceeded.

13 Claims, 7 Drawing Sheets

(51) Int. Cl.
*B60L 11/18* (2006.01)
*H02H 7/125* (2006.01)
*H02M 1/42* (2007.01)
*H02J 7/02* (2016.01)
*H02J 7/04* (2006.01)
*H02H 7/12* (2006.01)
*H02M 1/32* (2007.01)
*H02M 1/00* (2006.01)

(52) U.S. Cl.
CPC ............ *H02J 7/022* (2013.01); *H02J 7/045* (2013.01); *H02M 1/4208* (2013.01); *H02M 3/33569* (2013.01); *H02M 1/32* (2013.01); *H02M 2001/007* (2013.01); *Y02B 40/90* (2013.01); *Y02B 70/126* (2013.01)

(58) Field of Classification Search
CPC .. B60L 11/182; B60L 11/1811; H02H 7/1213; H02H 7/125; H02M 1/4208; H02M 3/33569; H02M 1/32; H02M 2001/007; Y02B 40/90; Y02B 70/126
USPC ..................................... 320/107, 108; 363/17
See application file for complete search history.

(56) References Cited

U.S. PATENT DOCUMENTS

| | | | | |
|---|---|---|---|---|
| 2008/0101096 | A1 | 5/2008 | Takayanagi et al. | |
| 2013/0314025 | A1* | 11/2013 | Keuss | H02J 7/045 320/107 |
| 2015/0006008 | A1* | 1/2015 | Wei | B60L 11/1816 701/22 |
| 2015/0288201 | A1* | 10/2015 | Hatakeyama | B60L 3/0069 320/107 |

FOREIGN PATENT DOCUMENTS

| | | |
|---|---|---|
| JP | 3-277134 | 12/1991 |
| JP | 11-98701 | 4/1999 |
| JP | 2004-134841 | 4/2004 |
| JP | 2007-267501 | 10/2007 |
| JP | 2008-118727 | 5/2008 |
| JP | 2009-131044 | 6/2009 |
| JP | 2009-171801 | 7/2009 |
| JP | 2012-114999 | 6/2012 |
| JP | 2012-157128 | 8/2012 |
| JP | 2013-126349 | 6/2013 |
| JP | 2014-27854 | 2/2014 |

OTHER PUBLICATIONS

Office Action dated Jan. 30, 2018 in corresponding Japanese Patent Application No. 2016-523087, 10 pp.
Extended European Search Report dated Jan. 23, 2018 in corresponding European Patent Application No. 14892934.2, 9 pp.
International Search Report dated Aug. 19, 2014, in corresponding International Application No. PCT/JP2014/064541.
"ISO26262", <http://www.jari.or.jp/tabid/112/Default.aspx>, accessed Nov. 11, 2015.

* cited by examiner

| DUPLICATION PATTERN | AC/DC CONVERTER FORCED STOP MEANS | DC/DC CONVERTER FORCED STOP MEANS |
|---|---|---|
| | HARDWARE/HARDWARE | HARDWARE/HARDWARE |
| | HARDWARE/HARDWARE | HARDWARE/SOFTWARE |
| | HARDWARE/SOFTWARE | HARDWARE/HARDWARE |
| | HARDWARE/SOFTWARE | HARDWARE/SOFTWARE |

FIG. 7B

| DUPLICATION PATTERN | AC/DC CONVERTER FORCED STOP MEANS | DC/DC CONVERTER FORCED STOP MEANS |
|---|---|---|
| | HARDWARE/HARDWARE | HARDWARE/HARDWARE |
| | HARDWARE/HARDWARE | HARDWARE/SOFTWARE |
| | HARDWARE/HARDWARE | SOFTWARE/SOFTWARE |
| | HARDWARE/SOFTWARE | HARDWARE/HARDWARE |
| | HARDWARE/SOFTWARE | HARDWARE/SOFTWARE |
| | HARDWARE/SOFTWARE | SOFTWARE/SOFTWARE |
| | SOFTWARE/SOFTWARE | HARDWARE/HARDWARE |
| | SOFTWARE/SOFTWARE | HARDWARE/SOFTWARE |
| | SOFTWARE/SOFTWARE | SOFTWARE/SOFTWARE |

CHARGER HAVING FORCED STOP EXECUTION CIRCUIT TO PROVIDE PROTECTION TO A PROTECTION TARGET

CROSS-REFERENCE TO RELATED APPLICATIONS

This application is a continuation application, filed under 35 U.S.C. § 111(a), of International Application PCT/JP2014/064541 filed on May 30, 2014, the entire contents of which are hereby incorporated by reference.

BACKGROUND

1. Field

The present disclosure relates to a charger that charges a battery, and in particular, relates to a charger that charges a battery of a vehicle that runs with a motor as a power source.

2. Related Art

Specific examples of this kind of vehicle include an electric vehicle and a hybrid vehicle. A battery of a high voltage dangerous to a human body is mounted in this kind of vehicle, and a vehicle-mounted charger for charging the vehicle-mounted battery also uses high voltage, because of which sufficient consideration needs to be given to safety. To describe in more detail, this kind of vehicle-mounted charger commonly has such a configuration that an AC/DC converter and a DC/DC converter are connected in series, and a smoothing capacitor that once converts alternating current power supplied from an external alternating current power supply into direct current power, and stores the direct current power, is included in the AC/DC converter. With regard to the smoothing capacitor too, sufficient care needs to be taken in order that breakage due to overvoltage does not occur. ISO26262, officially published in 2011, is one example of automotive functional safety standards, including safety with regard to a vehicle-mounted charger (refer to http://www.jari.or.jp/tabid/112/Default.aspx).

SUMMARY

Providing detection means that detects voltage applied to a vehicle-mounted battery or current flowing into a vehicle-mounted battery, and forced stop means that causes charging to stop by comparing a result of the detection with a threshold, is included as technical means for protecting a vehicle-mounted battery from overvoltage or the like. However, it goes without saying that when a failure occurs in these means, a protection target instrument cannot be sufficiently protected.

The disclosure, having been contrived in consideration of the heretofore described problem, has an aspect of providing technology whereby protection of a protection target instrument, such as a vehicle-mounted battery or a smoothing capacitor of an AC/DC converter, is safer in a charger that charges a vehicle-mounted battery.

In order to solve the heretofore described problem, the disclosure provides a charger including an AC/DC converter having a PFC circuit that converts alternating current power supplied from an external alternating current power supply into direct current power and a smoothing capacitor that smoothes voltage output by the PFC circuit, a DC/DC converter that transforms direct current power output by the AC/DC converter and supplies the transformed direct current power to a vehicle-mounted battery, a first control unit that carries out control of an operation of the PFC circuit, and a second control unit that carries out control of an operation of the DC/DC converter, in which at least one of the smoothing capacitor and the vehicle-mounted battery is a protection target instrument, and the charger further includes first and second detection means that detect voltage applied to the protection target instrument or current flowing into the protection target instrument, first forced stop means that determines whether or not voltage or current detected by the first detection means exceeds a predetermined threshold, and causes a converter supplying power to the protection target instrument to stop when the predetermined threshold is exceeded, and second forced stop means that determines whether or not voltage or current detected by the second detection means exceeds the threshold, and causes a converter supplying power to the protection target instrument to stop when the threshold is exceeded.

According to this kind of charger, detection means that detects voltage applied to a protection target instrument or detection means that detects current flowing into a protection target instrument is duplicated, and forced stop means that causes a converter supplying power to a protection target instrument to stop, with voltage exceeding a threshold being applied to the protection target instrument or current exceeding a threshold flowing into the protection target instrument as a trigger, is also duplicated. Therefore, protection of the protection target instrument from overvoltage or overcurrent can be realized more safely than in a case where the detection means and forced stop means are not duplicated.

The first forced stop means has first determination means and first forced stop execution means. The first determination means determines whether or not voltage or current detected by the first detection means exceeds a predetermined threshold, and outputs a signal indicating a result of the determination. The first forced stop execution means, with a reception from the first determination means of a signal indicating that voltage or current detected by the first detection means exceeds the threshold as a trigger, executes a forced stop of a converter supplying power to the protection target instrument. The second forced stop means also has second determination means and second forced stop execution means. The second determination means determines whether or not voltage or current detected by the second detection means exceeds a predetermined threshold, and outputs a signal indicating a result of the determination. The second forced stop execution means, with a reception from the second determination means of a signal indicating that voltage or current detected by the second detection means exceeds the threshold as a trigger, executes a forced stop of a converter supplying power to the protection target instrument.

The first and second determination means may be hardware modules in which a comparator and a circuit supplying threshold voltage to the comparator are combined, or may be software modules realized by causing a control unit, of first and second control units, that controls a converter supplying power to a protection target instrument (a DC/DC converter in case the protection target instrument is a vehicle-mounted battery and an AC/DC converter (more precisely, a PFC circuit) in case the protection target instrument is a smoothing capacitor) to operate in accordance with software. Generally, compared with an aspect in which the first and second determination means are both realized by hardware modules (in other words, an aspect in which determination means is duplicated by hardware modules alone), it is necessary to use a control unit of higher performance (a control unit with a higher degree of integration) in the case of an aspect in which at least one of the first and second determination means is realized by a software module. When using a semiconductor chip with a high degree of integration, failure is liable to occur, and there is concern that reliability will decrease, but it is expected that the manufacturing cost of the charger will be suppressed by an amount commensurate with not needing to design and mount a dedicated hardware module for the heretofore described determination process.

The protection target instrument may be the smoothing capacitor or the vehicle-mounted battery alone, or the smoothing capacitor and the vehicle-mounted battery may both be protection target instruments. In an aspect in which the smoothing capacitor and the vehicle-mounted battery are both protection target instruments, it is sufficient that the first and second detection means and the first and second forced stop means are provided for each protection target instrument.

When the smoothing capacitor and the vehicle-mounted battery are both protection target instruments, and at least one of the first and second determination means corresponding to each of the smoothing capacitor and the vehicle-mounted battery is realized by a software module, it is preferable that, when there is a difference between protection priority levels of the smoothing capacitor and the vehicle-mounted battery, at least one of the first and second determination means corresponding to the protection target instrument with the lower level of priority is realized by a software module, while the determination means corresponding to the other protection target instrument is duplicated by hardware modules alone. This is because a reduction in cost can be realized while maintaining reliability of protection of the protection target instrument with the higher level of priority.

Also, when there is no difference between the protection priority levels of the two protection target instruments, and when there is a difference between processing loads of the first and second control units that the control unit with the lower processing load is caused to carry out duplication of the determination means using a software module. This is in order that no impediment to an original function of the control unit (a function of carrying out control of an operation of the AC/DC converter or control of an operation of the DC/DC converter) occurs due to the processing load for realizing the determination means.

In one aspect, at least one of the first forced stop execution means and the second forced stop execution means is characterized by causing a converter supplying power to a protection target instrument to stop in accordance with a control signal applied from the exterior (for example, a control signal applied from a safety CPU). According to this kind of aspect, it can be confirmed that the forced stop function is working assuredly before a start of charging the vehicle-mounted battery, and protection of the protection target instrument can be realized even more safely.

In another aspect, one of the first control unit and the second control unit carries out monitoring of an operation of the other control unit, and the one control unit is characterized by causing a converter that is a control target of the other control unit to stop when the one control unit detects a fault of the other control unit. For example, an AC/DC control unit that carries out control of an operation of the AC/DC converter is caused to carry out monitoring of an operation of a DC/DC control unit that carries out control of an operation of the DC/DC converter, and the AC/DC control unit is caused to execute a process of forcibly stopping the DC/DC converter when a fault is detected.

According to the disclosure, protection of a protection target instrument such as a vehicle-mounted battery can be safer in a charger that charges a vehicle-mounted battery.

BRIEF DESCRIPTION OF THE DRAWINGS

These and/or other aspects and advantages will become apparent and more readily appreciated from the following description of the embodiments, taken in conjunction with the accompanying drawings of which.

DESCRIPTION OF EMBODIMENTS

Reference will now be made to the embodiments, examples of which are illustrated in the accompanying drawings, wherein like reference numerals refer to the like elements throughout. The embodiments are described below to explain the present disclosure by referring to the figures.

Hereafter, a description will be given of embodiments of the disclosure.

A: First Embodiment

Figure 1:
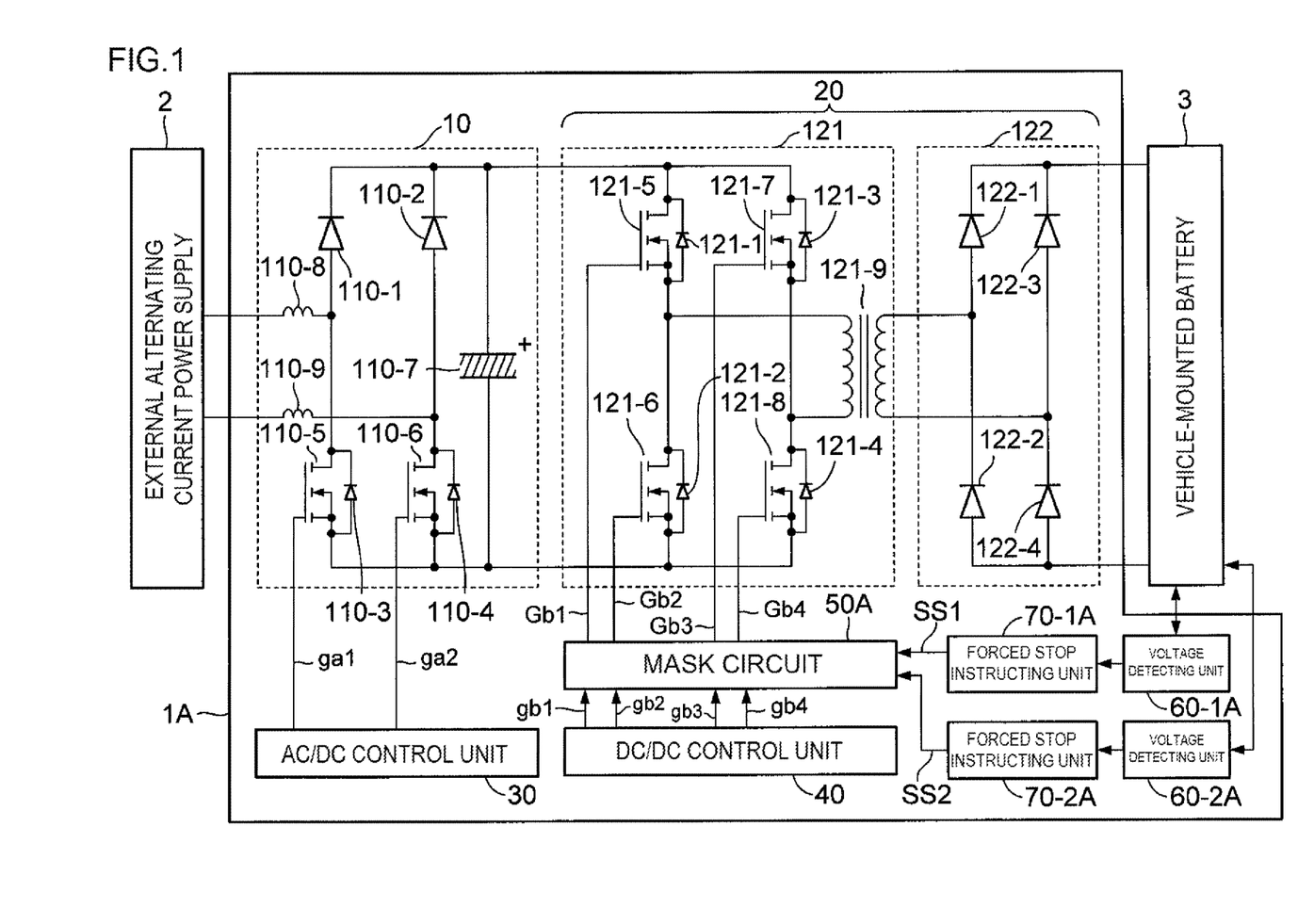
FIG. 1 is a diagram showing a configuration example of a charger of a first embodiment of the disclosure.

FIG. 1 is a diagram showing a configuration example of a charger 1A of a first embodiment of the disclosure.

The charger 1A, being a vehicle-mounted charger mounted in a vehicle having a motor as a power source, such as an electric vehicle or a hybrid vehicle, is a device that charges a vehicle-mounted battery 3 that supplies power to the motor. To describe in more detail, the charger 1A is connected via a power cable or the like to an external alternating current power supply 2, which is a household alternating current power supply (that is, a single phase 100V alternating current power supply), and converts alternating current power supplied from the external alternating current power supply 2 into direct current power, thereby charging the vehicle-mounted battery 3. As well as the charger 1A, the vehicle-mounted battery 3 that is the charging target of the charger 1A, and the external alternating current power supply 2, are shown in FIG. 1.

In this embodiment, the vehicle-mounted battery 3 is a protection target instrument, and the charger 1A is configured so as to detect voltage applied to the vehicle-mounted battery 3, and stop the supply of power to the vehicle-mounted battery 3 when the detected voltage reaches a predetermined threshold or higher. As shown in FIG. 1, the charger 1A of this embodiment includes an AC/DC converter 10, a DC/DC converter 20, an AC/DC control unit 30, a DC/DC control unit 40, a mask circuit 50A, voltage detecting units 60-1A and 60-2A, and forced stop instructing units 70-1A and 70-2A.

The AC/DC converter 10 converts alternating current power supplied from the external alternating current power supply 2 into direct current power, and outputs the direct current power. The AC/DC converter 10 is configured with diodes 110-1 and 110-2, flywheel diodes 110-3 and 110-4, FETs 110-5 and 110-6, a smoothing capacitor 110-7, and reactors 110-8 and 110-9. The reactors 110-8 and 110-9 are provided in order to attenuate high frequency. The diodes 110-1 and 110-2 and FETs 110-5 and 110-6 configure a PFC circuit that rectifies alternating current voltage supplied from the external alternating current power supply 2 and supplies direct current voltage to the smoothing capacitor 110-7. Each of the FETs 110-5 and 110-6 is turned on when a drive signal having an active level is applied to a gate thereof, and turned off when the drive signal having a non-active level is applied to the gate.

The smoothing capacitor 110-7 is an electrolytic capacitor provided in order to smooth direct current voltage output from the PFC circuit. The flywheel diodes 110-3 and 110-4 are connected in anti-parallel to the FETs 110-5 and 110-6, and cause a backflow to the input power supply (in this embodiment, the external alternating current power supply 2) side of current generated by electromagnetic energy accumulated in the reactors 110-8 and 110-9 when switching the FETs 110-5 and 110-6 on and off.

The AC/DC control unit 30 is, for example, a CPU (Central Processing Unit), receives data (for example, data indicating the remaining charge) indicating the state of charge of the vehicle-mounted battery 3 from a BCU (Battery Control Unit, omitted from FIG. 1) via a CAN-BUS, and carries out control of an operation of the AC/DC converter 10 in accordance with the state of charge of the vehicle-mounted battery 3. To describe in more detail, the AC/DC control unit 30 switches the signal level of drive signals ga1 and ga2 applied to the gates of the FETs 110-5 and 110-6 respectively from an active level (for example, a high level) to a non-active level (for example, a low level), or vice versa, so that a preferred voltage or current in accordance with the state of charge of the vehicle-mounted battery 3 is output from the AC/DC converter 10. Therefore, control of the operation of the AC/DC converter 10 is realized.

The DC/DC converter 20 is connected in series to the AC/DC converter 10. The DC/DC converter 20 is configured with an inverter 121 and a rectifier 122. The inverter 121 is configured with FETs 121-5 to 121-8, flywheel diodes 121-1 to 121-4, and a transformer 121-9. The inverter 121 is a circuit that, with the direct current voltage with which the smoothing capacitor 110-7 of the AC/DC converter 10 is charged as power supply voltage, outputs alternating current voltage to a primary winding of the transformer 121-9 by switching the power supply voltage using the FETs 121-5 to 121-8. Each of the FETs 121-5 to 121-8 too is turned on when drive signal having the active level is applied to a gate thereof, and turned off when the drive signal having the non-active level is applied to the gate.

The transformer 121-9 outputs alternating current voltage in accordance with the alternating current voltage applied to the primary winding to the rectifier 122 from a secondary winding. The rectifier 122 rectifies the alternating current voltage output from the secondary winding of the transformer 121-9 using diodes 122-1 to 122-4, and supplies direct current voltage to the vehicle-mounted battery 3.

Like the AC/DC control unit 30, the DC/DC control unit 40 is a CPU. The DC/DC control unit 40 outputs drive signals gb1 to gb4 for switching elements included in the inverter 121 (in this embodiment, the FETs 121-5 to 121-8) on and off. By the switching cycle of the switching elements being regulated in accordance with the state of charge of the vehicle-mounted battery 3, preferred voltage or current in accordance with the state of charge is supplied from the DC/DC converter 20 to the vehicle-mounted battery 3. That is, the DC/DC control unit 40 is for carrying out control of an operation of the DC/DC converter 20. As shown in FIG. 1, the drive signals gb1 to gb4 are applied one each via the mask circuit 50A to the switching elements as drive signals Gb1 to Gb4 respectively.

As well as the drive signals gb1 to gb4 being applied to the mask circuit 50A, a forced stop instruction signal SS1 is applied from the forced stop instructing unit 70-1A, and a forced stop instruction signal SS2 is applied from the forced stop instructing unit 70-2A, as shown in FIG. 1. When the forced stop instruction signal SS1 and the forced stop instruction signal SS2 are both at a non-active level (for example, a low level), the mask circuit 50A allows the drive signals gb1 to gb4 to pass through as the drive signals Gb1 to Gb4, and when at least one of the forced stop instruction signal SS1 and the forced stop instruction signal SS2 switches to an active level, the mask circuit 50A interrupts the drive signals Gb1 to Gb4 (that is, the mask circuit 50A maintains the drive signals Gb1 to Gb4 at the non-active level). When the drive signals Gb1 to Gb4 are maintained at the non-active level, switching of the switching elements included in the inverter 121 (that is, the FETs 121-5 to 121-8) stops, whereby the DC/DC converter 20 stops.

Figure 2A:
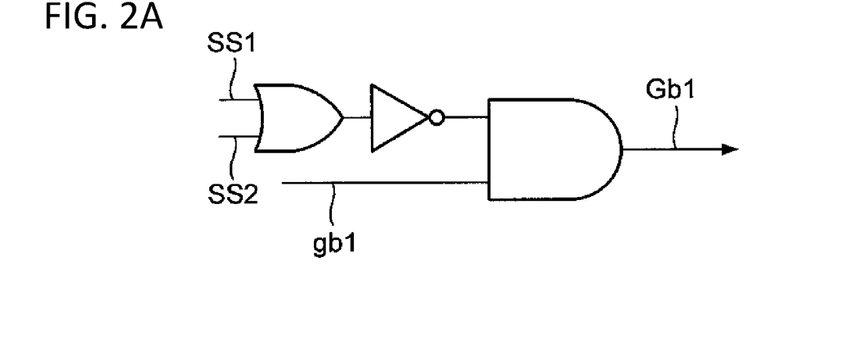
FIGS. 2A-2C are diagrams, each showing a configuration example of a mask circuit included in the first embodiment of the charger.

Various configurations are conceivable as a specific circuit configuration of the mask circuit 50A. For example, as shown in FIG. 2A, an aspect such that the mask circuit 50A is configured with sets of an OR gate, an inverter, and an AND gate provided one each for the multiple switching elements included in the inverter 121 is conceivable. Only a configuration corresponding to the FET 121-5, of the four FETs included in the inverter 121, is shown in FIG. 2A. As shown in FIG. 2A, the forced stop instruction signal SS1 and the forced stop instruction signal SS2 are applied to the OR gate, and an output signal of the OR gate is input into one input terminal of the AND gate via logical inversion by the inverter. The drive signal gb1 is applied to the other input terminal of the AND gate. Therefore, the drive signal gb1 output from the DC/DC control unit 40 passes through the AND gate while the forced stop instruction signals SS1 and SS2 are both at the non-active level, and is applied to the gate of the FET 121-5 as the drive signal Gb1. Further, when at least one of the forced stop instruction signals SS1 and SS2 switches from the non-active level to the active level, the drive signal gb1 output from the DC/DC control unit 40 is interrupted in the AND gate, and the drive signal Gb1 is maintained at the low level. Therefore, the FET 121-5 is maintained in an off-state.

Figure 2B:
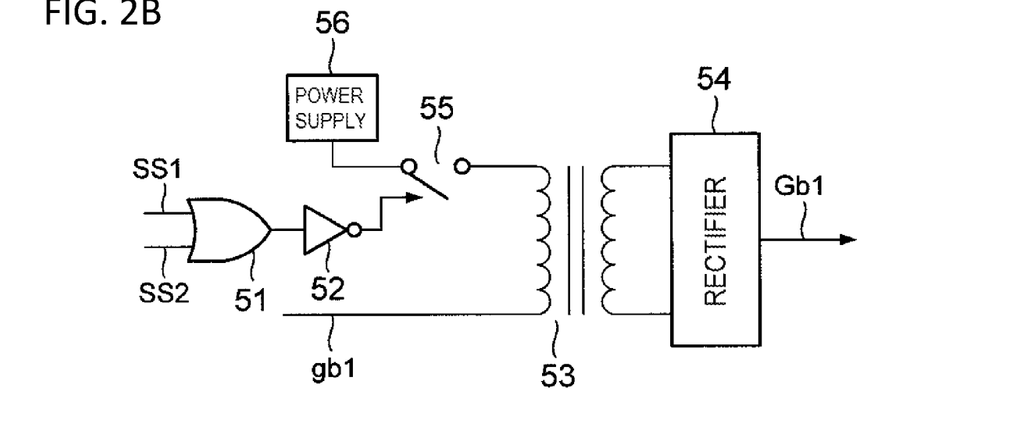

An aspect in which the mask circuit 50A is configured with an OR gate 51, an inverter 52, a pulse transformer 53, a rectifier 54, and a switching element 55 corresponding to each switching element included in the inverter 121, and a power supply 56 that supplies power to a primary side of the pulse transformer 53 via the switching element 55, is conceivable as another configuration example of the mask circuit 50A. In the same way as in FIG. 2A, only a configuration corresponding to the FET 121-5 is shown in FIG. 2B. The drive signal gb1 output by the DC/DC control unit 40 is applied to one end of a primary winding of the pulse transformer 53, while the other end is connected via the switching element 55 to the power supply 56. The switching element 55 is switched on and off in accordance with a signal applied from the OR gate 51 via the inverter 52. Specifically, the switching element 55 is switched on when a signal having an active level is applied from the inverter 52, and the switching element 55 is switched off when a signal having a non-active level is applied. As shown in FIG. 2B, the forced stop instruction signal SS1 and the forced stop instruction signal SS2 are applied to the OR gate 51, and a signal expressing the logical sum of the two signals is output from the OR gate 51 to the inverter 52. Consequently, when the forced stop instruction signal SS1 and the forced stop instruction signal SS2 are both at the non-active level, the output signal of the inverter 52 switches to the active level and the switching element 55 is turned on, and when at least one of the forced stop instruction signal SS1 and the forced stop instruction signal SS2 is at the active level, the output signal of the inverter 52 switches to the non-active level and the switching element 55 is turned off.

When the switching element 55 is in the on-state, voltage generated in a secondary winding of the pulse transformer 53 in accordance with the drive signal gb1 output by the DC/DC control unit 40 is rectified by the rectifier 54, and applied to the FET 121-5 as the drive signal Gb1 that switches the FET 121-5 on and off. As opposed to this, when the switching element 55 is in the off-state, the supply of power to the primary side of the pulse transformer 53 is interrupted, whereby the drive signal Gb1 is also interrupted. In the case of the mask circuit 50A having the configuration that an AND gate is used, as shown in FIG. 2A, there is concern that the supply of the drive signals Gb1 to Gb4 to the inverter 121 cannot be interrupted when the AND gate breaks. As opposed to this, by employing the mask circuit 50A having the configuration that a pulse transformer is used, as shown in FIG. 2B, the supply of the drive signals Gb1 to Gb4 to the inverter 121 can be interrupted, and the DC/DC converter 20 stopped, more assuredly than when the mask circuit 50A of the configuration shown in FIG. 2A is employed.

Figure 2C:
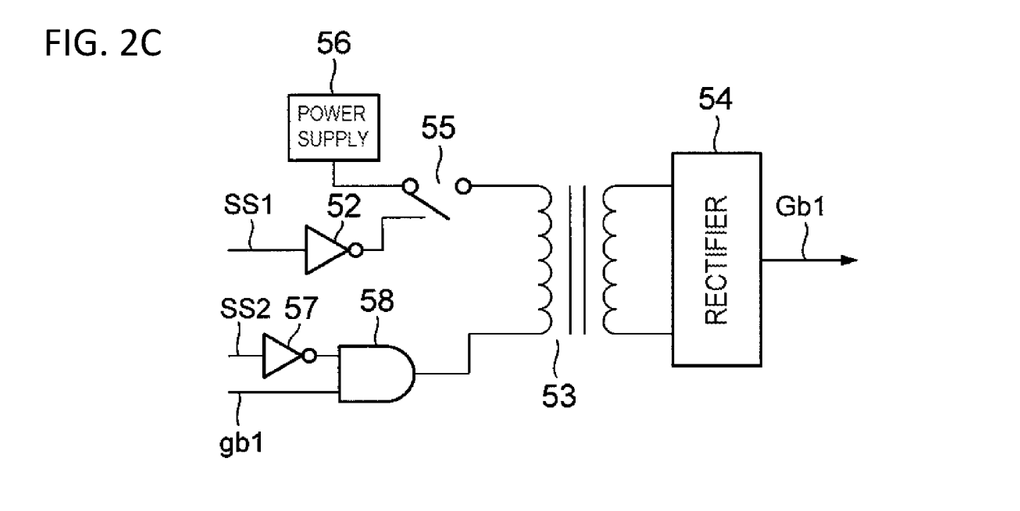

The configuration shown in FIG. 2C is conceivable as still another example of the mask circuit 50A, and in this embodiment, a circuit of the configuration shown in FIG. 2C is employed as the mask circuit 50A. In the same way as in the cases in FIG. 2A and FIG. 2B, only a configuration corresponding to the FET 121-5 is shown in FIG. 2C. The mask circuit shown in FIG. 2C is the same as the mask circuit shown in FIG. 2B in that voltage generated in the secondary winding of the pulse transformer 53 is rectified by the rectifier 54 and applied to the FET 121-5 as the drive signal Gb1 that switches the FET 121-5 on and off, and that one end of the primary winding of the pulse transformer 53 is connected via the switching element 55 to the power supply 56. However, the mask circuit shown in FIG. 2C differs in that control of turning the switching element on and off is carried out by a signal that is the forced stop instruction signal SS1 logically inverted by the inverter 52, and that an AND signal of a signal that is the forced stop instruction signal SS2 logically inverted by an inverter 57 and the drive signal gb1 is generated by an AND gate 58, and the AND signal applied to the other end of the primary winding of the pulse transformer 53.

The mask circuit shown in FIG. 2C is such that when the forced stop instruction signal SS1 and the forced stop instruction signal SS2 are both input at the active level, the supply of the drive signal Gb1 to the inverter 121 can be interrupted, and the DC/DC converter 20 stopped, even when one of the inverter 57 and the AND gate 58, or the inverter 52, fails. As opposed to this, the mask circuit of the configuration shown in FIG. 2B is such that the supply of the drive signal Gb1 to the inverter 121 cannot be interrupted when the OR gate 51 or the inverter 52 fails. In this embodiment, the mask circuit of the configuration shown in FIG. 2C is employed as the mask circuit 50A, in order that the supply of the drive signals Gb1 to Gb4 to the inverter 121 can be assuredly interrupted.

Each of the voltage detecting unit 60-1A and voltage detecting unit 60-2A is a sensor that detects voltage applied to the vehicle-mounted battery 3, and outputs a signal indicating the value of the detection. As shown in FIG. 1, an output signal of the voltage detecting unit 60-1A is applied to the forced stop instructing unit 70-1A, while an output signal of the voltage detecting unit 60-2A is applied to the forced stop instructing unit 70-2A. Hereafter, the voltage detecting units 60-1A and 60-2A will be referred to as a "voltage detecting unit 60" when there is no need to distinguish between the two. In the same way, the forced stop instructing unit 70-1A and the forced stop instructing unit 70-2A will be referred to as a "forced stop instructing unit 70" when there is no need to distinguish between the two.

The forced stop instructing unit 70 is, for example, a comparator, in which the output signal of the voltage detecting unit 60 is applied to one of two input terminals, while a signal expressing a predetermined threshold voltage is applied to the other input terminal. The forced stop instructing unit 70 compares a voltage value expressing the output signal of the voltage detecting unit 60 and the threshold voltage, outputs the forced stop instruction signal having the non-active level when the former is lower than the latter, and outputs the forced stop instruction signal having the active level when the former is equal to or higher than the latter. That is, the forced stop instructing unit 70 functions as determination means that determines whether or not the voltage detected by the voltage detecting unit 60 exceeds the predetermined threshold voltage, and outputs a signal (in this embodiment, the forced stop instruction signal) indicating a result of the determination. As it is sufficient that the threshold voltage is specified as a preferred value in accordance with the breakdown voltage of the vehicle-mounted battery 3, it is sufficient that a commonly known constant voltage generating circuit is used for the generation of the threshold voltage. As previously described, when at least one of the forced stop instruction signals SS1 and SS2 switches to the active level, the DC/DC converter 20 stops.

In this embodiment, the forced stop instructing unit 70-1A functions as first determination means that outputs the forced stop instruction signal SS1 in accordance with the result of the detection by the voltage detecting unit 60-1A, and the inverter 52 and switching element 55 of the mask circuit 50A (refer to FIG. 2C) function as first forced stop execution means that executes a forced stop of the DC/DC converter 20 with a reception of the forced stop instruction signal SS1 having the active level as a trigger. In the same way, the forced stop instructing unit 70-2A functions as second determination means that outputs the forced stop instruction signal SS2 in accordance with the result of the detection by the voltage detecting unit 60-2A, and the inverter 57 and AND gate 58 of the mask circuit 50A (refer to FIG. 2C) function as second forced stop execution means that executes a forced stop of the DC/DC converter 20 with a reception of the forced stop instruction signal SS2 having the active level as a trigger. That is, in this embodiment, forced stop means that executes a forced stop of the DC/DC converter 20 is duplicated with first forced stop means, formed of the first determination means and the first forced stop execution means, and second forced stop means, formed of the second determination means and the second forced stop execution means.

As heretofore described, this embodiment is such that protection of the vehicle-mounted battery 3 from overvoltage is realized by providing the detection means, which detects the voltage applied to the vehicle-mounted battery 3, and the forced stop means, which forcibly stops the DC/DC converter 20 in accordance with a result of comparing the magnitudes of the voltage detected by the detection means and the threshold voltage. Further, as each of the detection means and the forced stop means is duplicated, protection of the vehicle-mounted battery 3 from overvoltage can be realized more safely than in a case where the detection means and the forced stop means are not duplicated.

B: Second Embodiment

In the first embodiment, the vehicle-mounted battery 3 is the protection target instrument, but it is also conceivable that the smoothing capacitor 110-7 is the protection target instrument. This is because when overvoltage is applied to the smoothing capacitor 110-7, there is concern that an electrolyte leak (a liquid leak, gas leak, or the like) failure will occur. When the smoothing capacitor 110-7 is the protection target instrument, it is sufficient that a charger 1B of the configuration shown in FIG. 3 is used.

Figure 3:
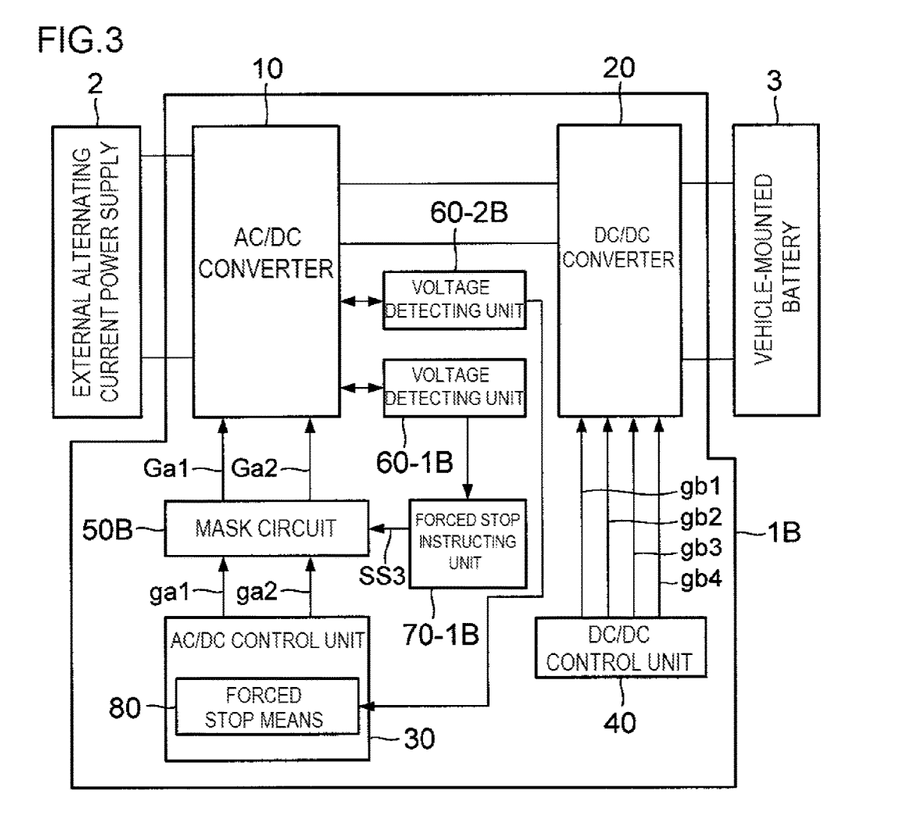
FIG. 3 is a diagram showing a configuration example of a charger of a second embodiment of the disclosure.

In FIG. 3, the same reference signs are allotted to components the same as components in FIG. 1. Detailed configurations of the AC/DC converter 10 and DC/DC converter 20 are omitted from FIG. 3 in order to prevent the drawing from becoming complex. As is clear when contrasting FIG. 3 and FIG. 1, the configuration of the charger 1B differs from the configuration of the charger 1A in that a mask circuit 50B is provided instead of the mask circuit 50A, voltage detecting units 60-1B and 60-2B are provided instead of the voltage detecting units 60-1A and 60-2A, and a forced stop instructing unit 70-1B and forced stop means 80 are provided instead of the forced stop instructing units 70-1A and 70-2A. Hereafter, in order to avoid redundancy, a description will be given centered on differences from the first embodiment.

Figure 4A:
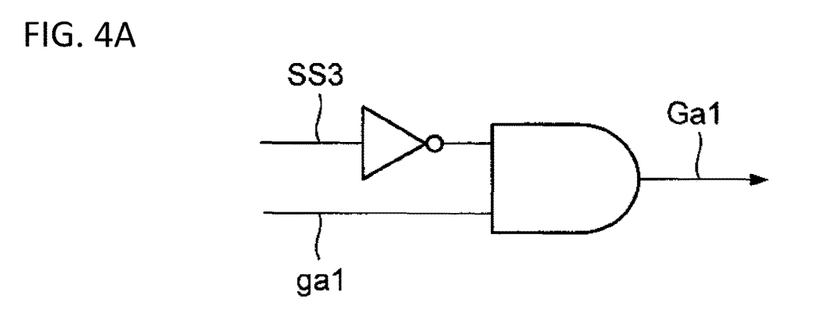
FIGS. 4A and 4B are diagrams, each showing a configuration example of a mask circuit included in the second embodiment of the charger.
Figure 4B:
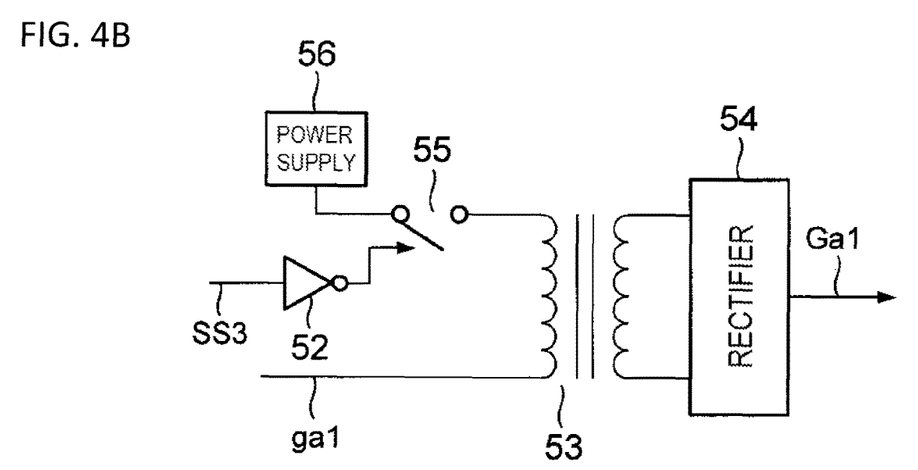

This embodiment differs from the first embodiment in that the drive signals gb1 to gb4 output by the DC/DC control unit 40 are applied unchanged to the switching elements of the inverter 121, and the drive signals ga1 and ga2 output by the AC/DC control unit 30 are applied via the mask circuit 50B to the switching elements of the AC/DC converter 10 as the drive signals Ga1 and Ga2. The mask circuit 50B differs from the mask circuit 50A in the first embodiment in that the mask circuit 50B allows the drive signals ga1 and ga2 output by the AC/DC control unit 30 to pass through unchanged as the drive signals Ga1 and Ga2 while a forced stop instruction signal SS3 having a non-active level is being applied from the forced stop instructing unit 70-1B, and interrupts the drive signals ga1 and ga2 when the forced stop instruction signal SS3 having an active level is applied. Although a detailed description will be omitted, the configuration shown in FIG. 4A and the configuration shown in FIG. 4B are conceivable as a configuration of the mask circuit 50B.

Like the voltage detecting unit 60 in the first embodiment, the voltage detecting unit 60-1B and voltage detecting unit 60-2B are pressure sensors. The voltage detecting unit 60-1B and voltage detecting unit 60-2B detect voltage applied to the smoothing capacitor 110-7 (omitted from FIG. 3) included in the AC/DC converter 10, and output a signal indicating a value of the detection. As shown in FIG. 3, the output signal of the voltage detecting unit 60-1B is applied to the forced stop instructing unit 70-1B, while the output signal of the voltage detecting unit 60-2B is applied to the forced stop means 80.

Like the forced stop instructing unit 70 in the first embodiment, the forced stop instructing unit 70-1B is a comparator. The output signal of the voltage detecting unit 60-1B is applied to one of two input terminals included in the forced stop instructing unit 70-1B, while a predetermined threshold voltage is applied to the other input terminal. With regard to this threshold voltage too, as it is sufficient that the threshold voltage is specified as a preferred value in accordance with the breakdown voltage of the smoothing capacitor 110-7, it is sufficient that a commonly known constant voltage generating circuit is used for the generation of the threshold voltage. In this embodiment, the output signal of the comparator is the forced stop instruction signal SS3. The forced stop instructing unit 70-1B outputs the forced stop instruction signal SS3 having the non-active level when the voltage expressed by the output signal of the voltage detecting unit 60-1B is lower than the threshold voltage, and outputs the forced stop instruction signal SS3 having the active level when the voltage expressed by the output signal of the voltage detecting unit 60-1B is equal to or higher than the threshold voltage. As previously described, when the forced stop instruction signal SS3 switches to the active level, the drive signals Ga1 and Ga2 are interrupted by the mask circuit 50B, whereby the AC/DC converter 10 is forcibly stopped. That is, the mask circuit 50B and the forced stop instructing unit 70-1B perform the role of first forced stop means, which forcibly stops the AC/DC converter 10 in accordance with a result of comparing the magnitudes of the voltage detected by the voltage detecting unit 60-1B and the threshold voltage.

Figure 5A:
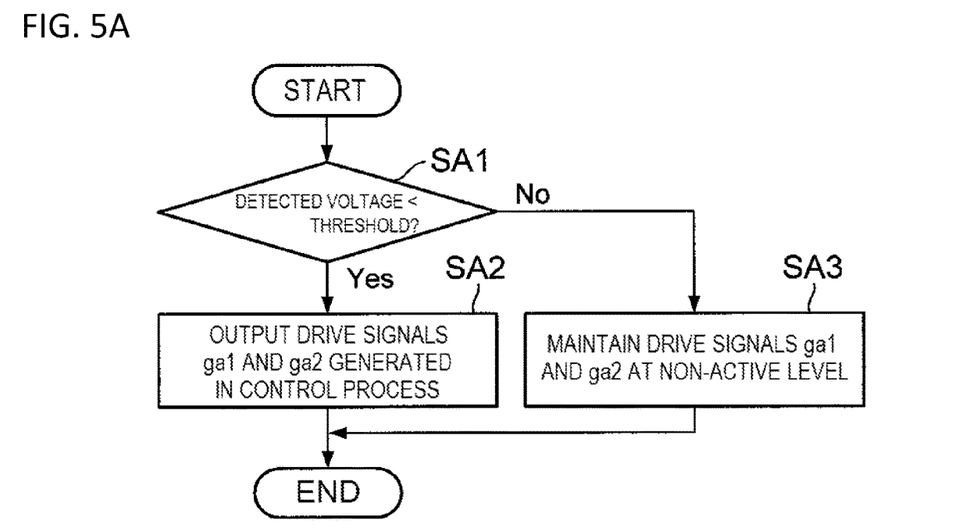
FIGS. 5A and 5B are flowcharts, each showing a flow of a forced stop process executed by forced stop means of the charger.

The forced stop means 80 is a software module realized by causing the CPU that is the AC/DC control unit 30 to execute a program for protecting the smoothing capacitor 110-7. As an example of the program, a program that causes the CPU to execute a process of the flowchart shown in FIG. 5A in parallel with the process of controlling the AC/DC converter 10 is included. As shown in FIG. 5A, the CPU that operates in accordance with this program determines whether or not a voltage value expressed by the output signal of the voltage detecting unit 60-2B is lower than the threshold voltage (step SA1), and outputs the drive signals ga1 and ga2 generated in the control process unchanged when the result of the determination is "Yes" (step SA2). As opposed to this, the CPU maintains the drive signals ga1 and ga2 at the non-active level when the result of the determination in step SA1 is "No" (step SA3). When the drive signals ga1 and ga2 are maintained at the non-active level, the drive signals Ga1 and Ga2 are maintained at the non-active level regardless of the presence or otherwise of interruption by the mask circuit 50B, whereby the AC/DC converter 10 is forcibly stopped. That is, the forced stop means 80 performs the role of second forced stop means, which forcibly stops the AC/DC converter 10 in accordance with a result of comparing the magnitudes of the voltage detected by the voltage detecting unit 60-2B and the threshold voltage.

According to this embodiment, when a fault such that voltage between polar plates of the smoothing capacitor 110-7 reaches the threshold voltage during charging of the vehicle-mounted battery 3 occurs, the AC/DC converter 10 can, of course, be forcibly stopped and breakage of the smoothing capacitor 110-7 thereby assuredly avoided, and both detection means, which detects the voltage applied to the smoothing capacitor 110-7, and the forced stop means, which forcibly stops the AC/DC converter 10 in accordance with a result of comparing the magnitudes of the voltage detected by the detection means and the threshold voltage, are duplicated. Therefore, protection of the smoothing capacitor 110-7 from overvoltage can be realized more safely than in a case where this kind of duplication is not employed.

In addition, in this embodiment, duplication of the forced stop means that forcibly stops the AC/DC converter 10 is realized by a software module (the forced stop means 80) and a hardware module (the mask circuit 50B and the forced stop instructing unit 70-1B), because of which the number of parts in the charger 1B can be reduced, and a cost reduction realized, in comparison with a case where the duplication is realized by hardware modules alone, as in the first embodiment.

Figure 5B:
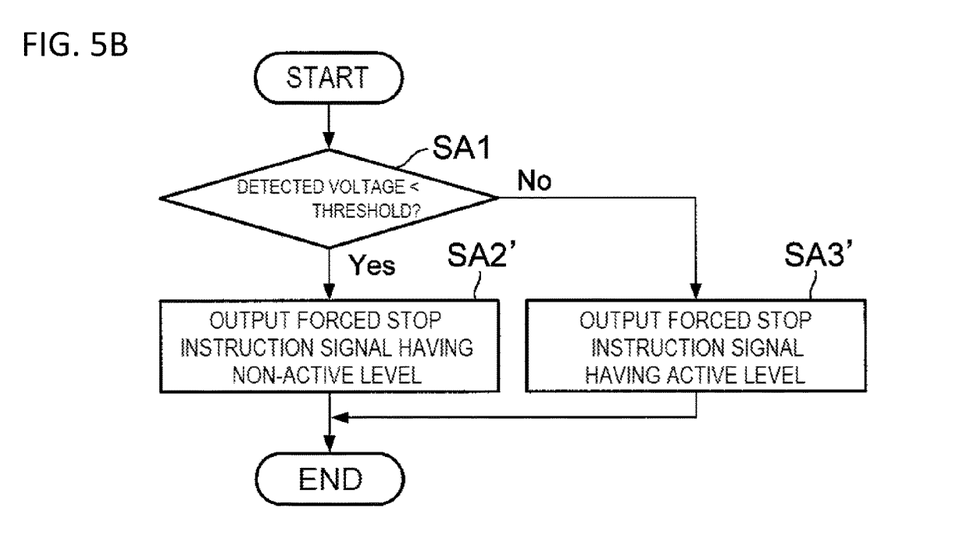

In this embodiment, a description has been given of a case where the forced stop means that forcibly stops the AC/DC converter 10 is duplicated with a hardware module and a software module, but duplication may of course be realized with hardware modules alone, in the same way as in the first embodiment. Conversely, duplication of the forced stop means that forcibly stops the DC/DC converter 20 in the first embodiment may of course be realized with a hardware module and a software module. Also, of the determination means and the forced stop execution means configuring the forced stop means in the first embodiment, the determination means may be realized by a software module. For example, the output signal of the voltage detecting unit 60-1A is applied to the AC/DC control unit 30 by deleting the forced stop instructing unit 70-1A from the configuration shown in FIG. 1, and the CPU that is the AC/DC control unit 30 is caused to execute a process of determining whether or not voltage expressed by the output signal is lower than the threshold voltage (step SA1), outputting the forced stop instruction signal SS1 having the non-active level when the result of the determination is "Yes" (step SA2'), and outputting the forced stop instruction signal SS1 having the active level when the result of the determination is "No" (step SA3'), as shown in FIG. 5B. Further, it is sufficient that the forced stop instruction signal SS1 generated in the process of FIG. 5B is applied to the mask circuit 50A. Hereafter, in addition to a case where the whole of the forced stop means is realized by a software module, like the forced stop means 80 in this embodiment, a case where, of the determination means and the forced stop execution means configuring the forced stop means, only the former is realized by a software module is also called "forced stop means realized by a software module".

C: Third Embodiment

Figure 6:
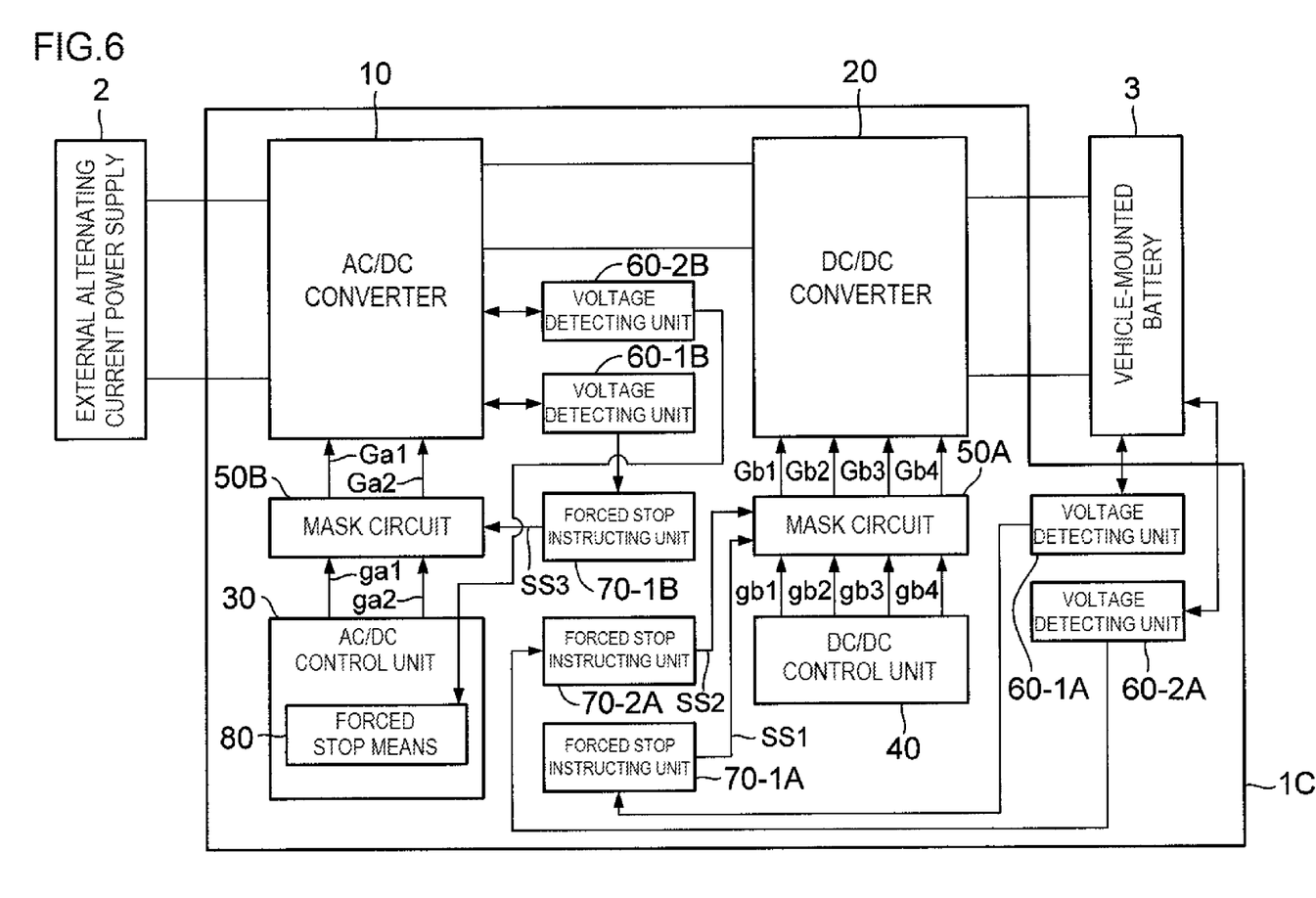
FIG. 6 is a diagram showing a configuration example of a charger of a third embodiment of the disclosure.

In the first embodiment, the vehicle-mounted battery 3 is the protection target, and in the second embodiment, the smoothing capacitor 110-7 is the protection target, but a case where the vehicle-mounted battery 3 and the smoothing capacitor 110-7 are both protection targets is of course conceivable. When the vehicle-mounted battery 3 and the smoothing capacitor 110-7 are both protection target instruments, it is sufficient that a charger 1C of the configuration shown in FIG. 6 is used. In FIG. 6, the same reference signs are allotted to components the same as components in FIG. 1 or FIG. 3. As is clear when contrasting FIG. 6 and FIG. 3, the configuration of the charger 1C differs from the charger 1B of the second embodiment in that the mask circuit 50A, voltage detecting units 60-1A and 60-2A, and forced stop instructing units 70-1A and 70-2A are provided.

The voltage detecting units 60-1A and 60-2A in the charger 1C perform the roles of first and second detection means that detect voltage applied to the vehicle-mounted battery 3, in the same way as the voltage detecting units 60-1A and 60-2A in the charger 1A. Further, the inverter 52 and the switching element 55 of the mask circuit 50A (refer to FIG. 2C) and the forced stop instructing unit 70-1A perform the role of the first forced stop means that forcibly stops the DC/DC converter 20, and the inverter 57 and the AND gate 58 of the mask circuit 50A (refer to FIG. 2C) and the forced stop instructing unit 70-2A perform the role of second forced stop means that forcibly stops the DC/DC converter 20. Also, the voltage detecting units 60-1B and 60-2B in the charger 1C perform the roles of first and second detection means that detect voltage applied to the smoothing capacitor 110-7, in the same way as the voltage detecting units 60-1B and 60-2B in the charger 1B, the mask circuit 50B and the forced stop instructing unit 70-1B perform the role of first forced stop means that forcibly stops the AC/DC converter 10, and the forced stop means 80 performs the role of second forced stop means that forcibly stops the AC/DC converter 10.

In this way, in this embodiment, the detection means that detects the voltage applied to each of the protection target instruments, which are the vehicle-mounted battery 3 and the smoothing capacitor 110-7, is duplicated, and each of the forced stop means that forcibly stops the converter that supplies power to the vehicle-mounted battery 3 (that is, the DC/DC converter 20) and the forced stop means that forcibly stops the converter that supplies power to the smoothing capacitor 110-7 (that is, the AC/DC converter 10) is also duplicated. Therefore, protection of each protection target instrument can be realized more safely than in a case where this kind of duplication is not employed.

In this embodiment, a description has been given of a case where the forced stop means that forcibly stops the DC/DC converter 20 is duplicated with hardware modules alone, and the forced stop means that forcibly stops the AC/DC converter 10 is duplicated with a hardware module and a software module, but the former forced stop means may of course be duplicated with a hardware module and a software module, and the latter forced stop means duplicated with hardware modules alone. Also, the forced stop means that forcibly stops the DC/DC converter 20 and the forced stop means that forcibly stops the AC/DC converter 10 may both be duplicated with hardware modules alone, while both may be duplicated with a hardware module and a software module. Consequently, the four combinations shown in FIG. 7A are conceivable as combinations of duplication of the forced stop means that forcibly stops the AC/DC converter 10 and duplication of the forced stop means that forcibly stops the DC/DC converter 20.

Figure 7A:
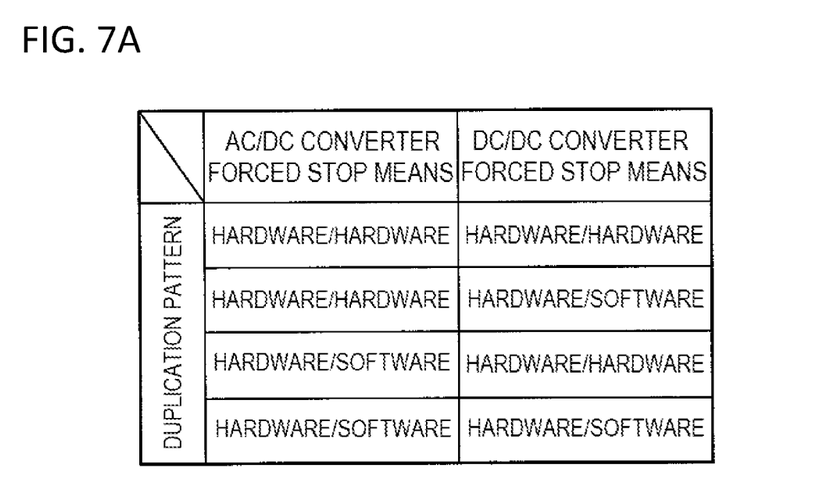
FIGS. 7A-B are diagrams for describing variations of the third embodiment.

Which of the four combinations shown in FIG. 7A is most preferable is specified in accordance with imposed conditions. For example, when adopting both the smoothing capacitor 110-7 and the vehicle-mounted battery 3 as protection target instruments, and attempting to reduce the manufacturing cost of the charger by duplicating either one of the forced stop means that forcibly stops the AC/DC converter 10 and the forced stop means that forcibly stops the DC/DC converter 20 with a hardware module and a software module, it is supposed that, when there is a difference between the protection priority levels of the two protection target instruments, it is preferable that the forced stop means corresponding to the protection target instrument with the lower level of priority is duplicated with a hardware module and a software module. For example, when the protection priority level of the smoothing capacitor 110-7 is low, the charger of the configuration shown in FIG. 6 is employed. Generally, when duplicating the forced stop means with a hardware module and a software module, it is necessary to use a control unit of higher performance (that is, a control unit with a higher degree of integration) than when realizing duplication with hardware modules alone, and concern regarding reliability remains. Consequently, it is supposed that a cost reduction can be realized, while maintaining the reliability of protection with the higher level of priority, by duplicating the forced stop means that forcibly stops the converter supplying power to the protection target instrument with the higher level of priority with hardware modules alone.

When there is a difference between the processing loads of the AC/DC control unit 30 and the DC/DC control unit 40, even when there is no difference between the protection priority levels of the smoothing capacitor 110-7 and the vehicle-mounted battery 3, it is preferable to realize duplication of the forced stop means using a software module and a hardware module by causing the control unit with the lower processing load to execute the software. This is in order that no impediment to an original function of the control unit (a function of carrying out control of an operation of the AC/DC converter or control of an operation of the DC/DC converter) occurs due to the processing load for realizing the forced stop means.

D: Modifications

Heretofore, a description has been given of first, second, and third embodiments of the disclosure, but these embodiments may be modified as followed.

(1) In each of the heretofore described embodiments, a description has been given of a case where the protection target instrument is protected from overvoltage by comparing the magnitudes of the voltage applied to the protection target instrument (that is, the vehicle-mounted battery 3 or the smoothing capacitor 110-7) and the predetermined threshold voltage, but the protection target instrument may also be protected from overcurrent by providing a current detecting unit that detects current flowing into the protection target instrument instead of the voltage detecting unit 60, and comparing the magnitudes of current detected by the current detecting unit and a predetermined threshold current. Also, the protection target instrument may be protected from overvoltage and also protected from overcurrent by replacing the voltage detecting unit 60-2A in the first embodiment with the heretofore described current detecting unit, and replacing the forced stop instructing unit 70-2A with a circuit that carries out a comparison of the magnitudes of current detected by the current detecting unit and the predetermined threshold current, and outputs the forced stop instruction signal SS2 in accordance with a result of the comparison. The same also applies to the second and third embodiments.

Figure 7B:
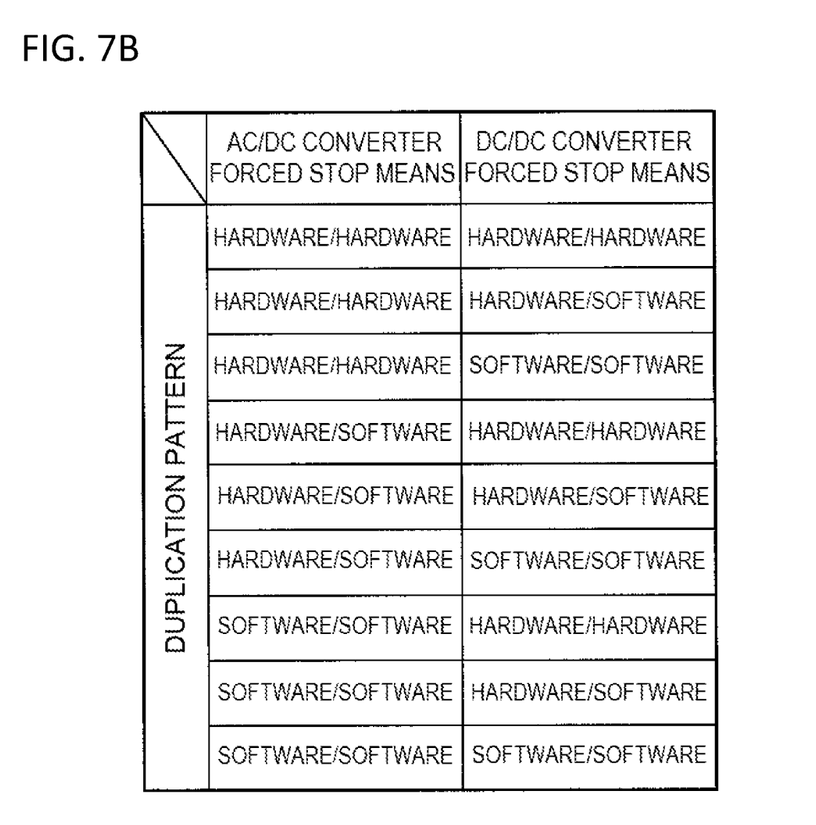

(2) In the second embodiment, the forced stop means for protecting the protection target instrument is duplicated using a hardware module and a software module. However, the forced stop means may be duplicated by providing a microcomputer that executes a process in accordance with the flowchart shown in FIG. 5B, separately from the AC/DC control unit 30, instead of the forced stop instructing unit 70-1B (that is, duplicated using only a software module). An aspect in which a microcomputer that executes a process in accordance with the flowchart shown in FIG. 5B is provided separately from the AC/DC control unit 30, as heretofore described, may be of a hot standby configuration that the microcomputer is caused to carry out monitoring of an operation of the AC/DC control unit 30, and when an operating fault of the AC/DC control unit 30 is detected, the microcomputer is caused to carry out control of the AC/DC converter 10 as a substitute for the AC/DC control unit 30. In the same way, the forced stop means that forcibly stops the DC/DC converter 20 may also be duplicated with software modules alone. Taking duplication using only software modules in this way into consideration, the nine combinations shown in FIG. 7B are conceivable as combinations of duplication of the forced stop means that forcibly stops the AC/DC converter 10 and duplication of the forced stop means that forcibly stops the DC/DC converter 20.

(3) An aspect in which a software module is utilized in both the duplication of the forced stop means that forcibly stops the AC/DC converter 10 and the duplication of the forced stop means that forcibly stops the DC/DC converter 20 may be such that one of the AC/DC control unit 30 and the DC/DC control unit 40 is caused to carry out monitoring of an operation of the other, and when an operating fault of the other control unit is detected, the one control unit is caused to forcibly stop the converter that is the control target of the other control unit (for example, the one control unit applies a forced stop instruction signal to the mask circuit through which the drive signal output by the other control unit passes).

Specifically, when the AC/DC control unit 30 is caused to carry out monitoring of an operation of the DC/DC control unit 40, and an operating fault of the DC/DC control unit 40 is detected, the AC/DC control unit 30 is caused to forcibly stop the DC/DC converter 20. According to this kind of aspect, it is expected that protection of the protection target instrument can be realized even more safely. An aspect in which a reply request is transmitted cyclically from the one control unit to the other, and it is determined that there is an operating fault when there is no reply by a certain time elapsing, is conceivable as a specific method of operation monitoring. An aspect in which the control unit being monitored is caused to transmit a "hallo" call in a constant cycle, and it is determined that there is a failure when no "hallo" call is received by a time in accordance with the constant cycle elapsing from the previous reception, is also conceivable. Also, when there is a discrepancy between operation clocks of the AC/DC control unit 30 and the DC/DC control unit 40, the control unit with the higher frequency may be caused to monitor the operation of the other control unit, detect a deviation of the operation clock of the other control unit from the reply cycle of the other control unit, and determine that a failure has occurred when the deviation of the operation clock exceeds an allowable value.

(4) An interruption circuit that interrupts a drive signal in accordance with a control signal applied from a safety CPU or the like may be provided in the mask circuit 50A or 50B. This is because whether or not forced stop means is functioning can be tested by causing the interruption circuit to operate, and by this kind of test being carried out before a start of charging the vehicle-mounted battery 3, protection of the protection target instrument can be realized even more safely.

(5) In the first embodiment or third embodiment, the DC/DC control unit 40 may be caused to execute a process of comparing voltages detected by the voltage detecting units 60-1A and 60-2A and detecting a failure of a voltage detecting unit in accordance with a result of the comparison, or a dedicated microcomputer that executes the heretofore described comparison and process of detecting a failure based on a result of the comparison may be provided. In the same way, in the second embodiment or the third embodiment, the AC/DC control unit 30 may be caused to execute a process of comparing voltages detected by the voltage detecting units 60-1B and 60-2B and detecting a failure of a voltage detecting unit in accordance with a result of the comparison, or a dedicated microcomputer that executes the heretofore described comparison and process of detecting a failure based on a result of the comparison may be provided. Also, in the first embodiment or the third embodiment, the DC/DC control unit 40 may be caused to execute a process of comparing output signals of the forced stop instructing units 70-1A and 70-2A and detecting a failure of a forced stop instructing unit in accordance with a result of the comparison, or a dedicated microcomputer that executes the heretofore described comparison and process of detecting a failure based on a result of the comparison may be provided. Also, the DC/DC control unit 40 or a dedicated microcomputer may be caused to execute a process of comparing threshold voltages generated by a constant voltage generating circuit included in each of the forced stop instructing units 70-1A and 70-2A and detecting a failure of a constant voltage generating circuit.

(6) In each of the heretofore described embodiments, a description has been given of an example in which the disclosure is applied to a vehicle-mounted charger, but the disclosure may of course also be applied to a charger installed in a charging station. This is because, even in the case of a charger installed in a charging station, there is still a demand for protection of the vehicle-mounted battery and smoothing capacitor when a fault occurs during charging, and it is still preferable that risk reduction at a level in accordance with a target safety level can be realized at low cost.

The aforementioned CPU of the various control units is an example of a hardware processor, which may be programmed to carry out the aforementioned CPU.

Any identification in this disclosure of problems, deficiencies, or other characterizations of any product or method of the related art does not imply or admit that such problems, deficiencies, or other characterizations were known in the prior art even if the product or method itself was known in the prior art.

Although embodiments have been shown and described, it would be appreciated by those skilled in the art that changes may be made in these embodiments without departing from the principles and spirit of the disclosure, the scope of which is defined in the claims and their equivalents.

Reference signs and numerals are as follows:
1A, 1B, 1C Charger
2 External alternating current power supply
3 Vehicle-mounted battery
10 AC/DC converter
20 DC/DC converter
30 AC/DC control unit
40 DC/DC control unit
50A, 50B Mask circuit
60, 60-1A, 60-2A, 60-1B, 60-2B Voltage detecting unit
70, 70-1A, 70-2A, 70-1B Forced stop instructing unit
80 Forced stop means

What is claimed is:
1. A charger configured to provide protection to one or more protection targets, comprising:
at least one hardware processor;
an AC/DC converter having a PFC circuit configured to convert alternating current power supplied from an external alternating current power supply into direct current power and a smoothing capacitor configured to smooth voltage output by the PFC circuit;
a DC/DC converter configured to transform direct current power output by the AC/DC converter and supply the transformed direct current power to a vehicle-mounted battery,
the one or more protection targets including at least one of the smoothing capacitor and the vehicle-mounted battery;
a first controller configured to carry out control of an operation of the PFC circuit; and
a second controller configured to carry out control of an operation of the DC/DC converter, wherein
the one or more protection targets include at least one of the smoothing capacitor and the vehicle-mounted battery, and
for each protection target of the one or more protection targets,
first and second detectors, each configured to detect voltage applied to the protection target or to detect current flowing into the protection target, are included in the charger, and
the charger is configured to
determine whether or not voltage or current detected by the first detector exceeds a predetermined threshold, and cause a converter supplying power to the protection target to stop supplying power when the predetermined threshold is exceeded,
determine whether or not voltage or current detected by the second detector exceeds the predetermined threshold, and cause a converter supplying power to the protection target to stop supplying power when the predetermined threshold is exceeded,
perform a first determination of whether or not voltage or current detected by the first detector exceeds the predetermined threshold, and output first a signal indicating a first determination, and the charger further comprises a first forced stop execution circuit configured to execute a first forced stop of a converter supplying power to the protection target, upon the first forced stop execution circuit receiving the first signal when the first signal is indicating that voltage or current detected by the first detector exceeds the predetermined threshold,
perform a second determination of whether or not voltage or current detected by the second detector exceeds the predetermined threshold, and output a second signal indicating a second determination, and the charger further comprises a second forced stop execution circuit configured to execute a second forced stop of a converter supplying power to the protection target, upon the second forced stop execution circuit receiving the second signal when the second signal is indicating that voltage or current detected by the second detector exceeds the predetermined threshold,
perform at least one of the first determination and the second determination using the at least one hardware processor or a comparator included in the charger, and
cause each controller that controls a converter supplying power to the protection target to operate in accordance with instructions of the at least one hardware processor.
2. The charger according to claim 1, wherein
the one or more protection targets include both the smoothing capacitor and the vehicle-mounted battery.

3. The charger according to claim 2, wherein, for each of the one or more protection targets, one of the first and second controllers:
carries out monitoring of an operation of the other one of the first and second controllers, and
causes a converter that is a control target of the other one of the first and second controllers to stop when the one of the first and second controllers detects a fault of the other one of the first and second controllers.

4. The charger according to claim 3, wherein, for each protection target of the one or more protection targets,
the charger causes a converter supplying power to a protection target instrument to stop in accordance with a signal applied from a source exterior to the charger.

5. The charger according to claim 2, wherein, for each protection target of the one or more protection targets,
the charger causes a converter supplying power to a protection target instrument to stop in accordance with a signal applied from a source exterior to the charger.

6. The charger according to claim 1, wherein, for each of the one or more protection targets,
one of the first and second controllers carries out monitoring of an operation of the other one of the first and second controllers, and
one of the first and second controllers causes a converter that is a control target of the other one of the first and second controllers to stop when the one of the first and second controllers detects a fault of the other one of the first and second controllers.

7. The charger according to claim 6, wherein, for each protection target of the one or more protection targets,
the charger causes a converter supplying power to a protection target instrument to stop in accordance with a signal applied from a source exterior to the charger.

8. The charger according to claim 1, wherein, for each protection target of the one or more protection targets,
when there is a difference between protection priority levels of the smoothing capacitor and the vehicle-mounted battery, the at least one of the first and the second determinations corresponds to the one of the protection targets with the lower level of priority.

9. The charger according to claim 1, wherein, for each protection target of the one or more protection targets,
when there is a difference between processing loads of the first and second controllers, at least one of the first and the second determinations correspond to the controller, among the first and second controllers, with the lower processing load.

10. The charger according to claim 1, wherein the one or more protection targets consists of the smoothing capacitor.

11. The charger according to claim 1, wherein the one or more protection targets consists of the vehicle-mounted battery.

12. The charger according to claim 1, further comprising
a first mask circuit that includes the first and second forced stop execution circuits for the smoothing capacitor; and
a second mask circuit that includes the first and second forced stop execution circuits for the vehicle-mounted battery, wherein
to carry out the control of the operation of the PFC circuit, the first controller transmits a drive signal through the first mask circuit, and
to carry out the control of the operation of the DC/DC converter, the second controller transmits a drive signal through the second mask circuit.

13. The charger according to claim 1, wherein
the comparator circuit performs the first determination and the second determination.

* * * * *